US011643563B2

(12) United States Patent
Velev et al.

(10) Patent No.: US 11,643,563 B2
(45) Date of Patent: May 9, 2023

(54) SILICONE COMPOSITIONS FOR THE THREE-DIMENSIONAL PRINTING (71) Applicant: NORTH CAROLINA STATE UNIVERSITY, Raleigh, NC (US)

(72) Inventors: Orlin D. Velev, Cary, NC (US); Sangchul Roh, Raleigh, NC (US)

(73) Assignee: North Carolina State University, Raleigh, NC (US)

(*) Notice: Subject to any disclaimer, the term of this patent is extended or adjusted under 35 U.S.C. 154(b) by 1152 days.

(21) Appl. No.: 16/317,073

(22) PCT Filed: Jul. 13, 2017

(86) PCT No.: PCT/US2017/041884
§ 371 (c)(1),
(2) Date: Jan. 11, 2019

(87) PCT Pub. No.: WO2018/013779
PCT Pub. Date: Jan. 18, 2018

(65) Prior Publication Data
US 2019/0264046 A1 Aug. 29, 2019

Related U.S. Application Data (60) Provisional application No. 62/361,729, filed on Jul. 13, 2016.

(51) Int. Cl.
| C09D 11/102 | (2014.01) |
| B33Y 10/00 | (2015.01) |
| B33Y 70/00 | (2020.01) |
| B29C 64/106 | (2017.01) |
| C09D 11/36 | (2014.01) |
| C09D 11/38 | (2014.01) |
| C08L 83/04 | (2006.01) |
| C09D 11/322 | (2014.01) |
| C09D 11/40 | (2014.01) |
| C09D 11/54 | (2014.01) |
| B29K 83/00 | (2006.01) |

(52) U.S. Cl.
CPC .......... C09D 11/102 (2013.01); B29C 64/106 (2017.08); B33Y 10/00 (2014.12); B33Y 70/00 (2014.12); C08L 83/04 (2013.01); C09D 11/322 (2013.01); C09D 11/36 (2013.01); C09D 11/38 (2013.01); C09D 11/40 (2013.01); C09D 11/54 (2013.01); *B29K 2083/00* (2013.01)

(58) Field of Classification Search
CPC ..... C09D 11/102; C09D 11/322; C09D 11/36; C09D 11/38; C09D 11/40; C09D 11/54; B29C 64/106; B33Y 10/00; B33Y 70/00; C08L 83/04; B29K 2083/00
See application file for complete search history.

(56) References Cited

U.S. PATENT DOCUMENTS

| 6,027,326 | A | 2/2000 | Cesarano et al. | |
| 7,879,419 | B2 | 2/2011 | Stocq | |
| 8,334,025 | B2 | 12/2012 | Fong et al. | |
| 2009/0292062 | A1* | 11/2009 | He ....................... | H05K 1/0353 524/508 |
| 2014/0017571 | A1* | 1/2014 | Lockett .................. | H01G 11/60 429/204 |
| 2016/0346997 | A1* | 12/2016 | Lewis .................... | B33Y 70/00 |
| 2017/0355187 | A1* | 12/2017 | Hashimoto .......... | B41J 2/04586 |
| 2017/0361534 | A1* | 12/2017 | Fernandez-Nieves ....................... | B29C 64/40 |
| 2018/0110901 | A1* | 4/2018 | Lewis ................... | B29C 64/106 |
| 2022/0106547 | A1* | 4/2022 | Petropolis ............. | C12M 35/08 |

FOREIGN PATENT DOCUMENTS

| EP | 1415792 A2 | 5/2004 |
| WO | 2015107333 | 7/2015 |
| WO | 2015120429 | 8/2015 |
| WO | 2016044547 A1 | 3/2016 |

OTHER PUBLICATIONS

Porous elastomeric beads from cross-linked emulsions, Olivier Dufaud and Eric Favre and Veronique M. Sadtler, Journal of Applied Polymer Science, vol. 83, pp. 967-971 (Year: 2002).*
Bharti, et al., Nanocapillarity-mediated magnetic assembly of nanoparticles into ultraflexible filaments and reconfigurable networks, Nat. Mater. 2015, 14, 1104.
Bharti, et al., Magnetophoretic assembly of flexible nanoparticles/lipid microfilaments, Faraday Discuss. 2015, 181, 437.
Bharti, et al., Capillary Bridging as a Tool for Assembling Discrete Clusters of Patchy Particles, J. Am. Chem. Soc. 2016, 14948.
Butt, H.-J. Controlling the flow of of Suspensions. Science 868-869 (2011).
Cesarano, et al., Recent Developments in Freeform Fabrication of Dense Ceramics from Slurry Desposition, Ceramic Industry. 1997, 25-32.
Chopin, J. & Kudrolli, A. Pearling and arching instabilities of a granular suspension on a superabsorbing surface. Soft Matter 11, 659-64 (2015).
Clausen, et al., Topology Optimized Architectures with Programmable Poisson's Ratio over Large Deformations, Adv. Mater. 2015, 27, 5523.
Conrad, J. C. et al. Designing colloidal suspensions for directed materials assembly. Curr. Opin. Colloid Interface Sci. 16, 71-79 (2011).
Gladman, et al., Biomimetic 4D printing, Nat. Mater. 2016, 1-7.
Gratson, et al., Microperiodic structures: Direct writing of three-dimensional webs, Nature 2004, 428, 386.

(Continued)

Primary Examiner — Nahida Sultana
(74) Attorney, Agent, or Firm — Meunier Carlin & Curfman LLC (57) ABSTRACT The present disclosure relates to compositions and methods for three-dimensional printing.

7 Claims, 8 Drawing Sheets (56) References Cited

OTHER PUBLICATIONS

Highley, et al., Direct 3D Printing of Shear-Thinning Hydrogels into Self-Healing Hydrogels., Adv. Mater. 2015, 27, 5075.
Hinton, T. J. et al., 3D printing PDMS elastomer in a hydrophilic support bath via freeform reversible embedding, ACS Biomater. Sci. Eng. 2016, 2, 1781-1786.
Hong, et al., 3D Printing of Highly Stretchable and Tough Hydrogels into Complex, Cellularized Structures, Adv. Mater. 2015, 4035.
Iveson, S. M., Litster, J. D., Hapgood, K. & Ennis, B. J. Nucleation, growth and breakage phenomena in agitated wet granulation processes: A review. Powder Technol. 117, 3-39 (2001).
Jang, K.-I. et al., Soft network composite materials with deterministic and bio-inspired designs. Nat. Commun. 6, 6566 (2015).
Kokkinis, M. Schaffner, A. R. Studart, Multimaterial magnetically assisted 3D printing of composite materials, Nat. Commun. 2015, 6, 8643.
Kolesky, D. B. et al., 3D bioprinting of vascularized, heterogeneous cell-laden tissue constructs, Adv. Mater. 2014, 26 (19), 3124-3130.
Kolesky, et al., Three-dimensional bioprinting of thick vascularized tissues, Proc. Natl. Acad. Sci. U. S. A. 2016, 113, 3179.
Koos, E. & Willenbacher, N. Capillary forces in suspension rheology. Science 331, 897-900 (2011).
Kudrolli, Granular matter: sticky sand, Nat. Mater. 2008, 7, 174-175.
Ladd, C.; So, J. H.; Muth, J.; Dickey, M. D. 3D printing of free standing liquid metal microstructures, Adv. Mater. 2013, 25, 5081-5085.
Lewis, J. A., Direct ink writing of 3D functional materials, Adv. Funct. Mater. 2006, 16, 2193-2204.
Lewis, J. A.; Gratson, G. M., Direct writing in three dimensions, Mater. Today 2004, 7, 32-39.
Li, Q. & Lewis, J. A. Nanoparticle Inks for Directed Assembly of Three-Dimensional Periodic Structures. Adv. Mater. 15, 1639-1643 (2003).
Lipton, J. I. et al., 3D Printable Wax-Silicone Actuators, In 2014 annual International Solid Freeform Fabrication Symposium, Austin, TX; 2014; pp. 848-856.
Lous, G. M., et al., Fabrication of piezoelectric ceramic/polymer composite transducers using fused deposition of ceramics, MRS Proc. 1998, 542, 124-128.
Martin, B. E. Fiore, R. M. Erb, Designing bioinspired composite reinforcement architectures via 3D magnetic printing, Nat. Commun. 2015, 6, 8641.
Mitarai, N. & Nori, F. Wet granular materials. Adv. Phys. 55, 1-45 (2006).
Morales, B. Bharti, M. D. Dickey, O. D. Velev, Bending of Responsive Hydrogel Sheets Guided by Field-Assembled Microparticle Endoskeleton Structures Small 2016, 12, 2283.
Morales, et al., Ionoprinted multi-responsive hydrogel actuators, Micromachines 2016, 7, 98.
Morissette, Direct-Write Fabrication of Pb (Nb, Zr, Ti) O3 Devices: Influence of Paste Rheology on Print Morphology and Component Properties. J. Am. Ceram. Soc. 2001, 84, 2462-2468.
Pakpour, M. Habibi, P. Møller, D. Bonn, How to construct the perfect sandcastle, Sci. Rep. 2012, 2, 549.
Parekh, C. Ladd, L. Panich, K. Moussa, M. D. Dickey, 3D printing of liquid metals as fugitive inks for fabrication of 3D microfluidic channels, Lab Chip 2016, 16, 1812.
Paulsen, J. D. et al. Optimal wrapping of liquid droplets with ultrathin sheets. Nat. Mater. 14, 1206-1210 (2015).
Py, C. et al. Capillary origami: Spontaneous wrapping of a droplet with an elastic sheet. Phys. Rev. Lett. 98, 2-5 (2007).
Qin, Z.; et al., Structural optimization of 3D-printed synthetic spider webs for high strength, Nat. Commun. 2015, 6 (May), 7038.
S. M. Iveson, J. D. Litster, Fundamental studies of granule consolidation part 2: Quantifying the effects of particle and binder properties, Powder Technol. 1998, 99, 243.
Scheel, M. et al. Morphological clues to wet granular pile stability. Nat. Mater. 7, 189-193 (2008).
Seerden, Ink-Jet Printing of Wax-Based Alumina Suspensions, J. Am. Ceram. Soc. 2001, 20, 2514-2520.
Shan, Multistable architected materials for trapping elastic strain energy, Adv. Mater. 2015, 27, 4296.
Skylar-Scott, et al., Laser-assisted direct ink writing of planar and 3D metal architectures, Proc. Natl. Acad. Sci. 2016, 113, 6137.
Smay, Colloidal inks for directed assembly of 3-D periodic structures. Langmuir 2002, 18, 5429-5437.
Smay, Directed colloidal assembly of 3D periodic structures, Adv. Mater. 2002, 14, 1279-1283.
Sommer, L. Alison, C. Minas, E. Tervoort, P. A. Rühs, A. R. Studart, 3D printing of concentrated emulsions into multiphase biocompatible soft materials., Soft Matter 2017, 13, 1974.
Song, et al., Formulation and multilayer jet printing of ceramic inks. Journal of the American Ceramic Society 82.12 (1999): 3374-3380.
Tumbleston, Continuous liquid interface production of 3D objects, Science 2015, 347, 1349.
Van Kao, Rheology of concentrated suspensions of spheres. II. Suspensions agglomerated by an immiscible second liquid, Colloid Interface Sci. 1975, 53, 367-373.
Velev, Direct measurement of lateral capillary forces, Langmuir 1993, 9, 3702.
Wang, J. Young's modulus of porous materials. J. Mater. Sci. 19, 801-808 (1984).
Wehner, An integrated design and fabrication strategy for entirely soft, autonomous robots, Nature 2016, 536, 451.
International Search Report and Written Opinion in PCT/US2017/041884 dated Oct. 12, 2017. 9 pages.

\* cited by examiner

BEST AVAILABLE IMAGE

SILICONE COMPOSITIONS FOR THE THREE-DIMENSIONAL PRINTING

CROSS REFERENCE TO RELATED APPLICATIONS

This application is a national stage application filed under 35 U.S.C. § 371 of PCT/US2017/041884 filed Jul. 13, 2017, which claims the benefit of U.S. Provisional Patent Application Ser. No. 62/361,729 filed Jul. 13, 2016, the disclosures of which are expressly incorporated herein by reference.

STATEMENT REGARDING FEDERALLY SPONSORED RESEARCH

This invention was made with government support under grant number W911NF-15-1-0115 awarded by the U.S. Army Research Office. The government has certain rights in the invention.

FIELD

The present disclosure relates to compositions and methods for three-dimensional printing.

BACKGROUND

Three-dimensional printing (3D printing) technology has evolved significantly over the last decade in its ability to fabricate structures with complex topographical features on the micro and macroscale. The 3D manufacturing via direct ink writing can shape various types of materials from plastics to metals by nozzle extrusion processes. The inks for direct writing with polymers mostly contain thermoplastics, which allows hot melt nozzle extrusion followed by rapid cooling and solidification into target shape. It is more difficult to do 3D printing with elastomeric polymers, as their precursors are normally liquid at ambient conditions. The post-ejection curing complicates and slows down the process.

One of the most widely used elastomeric polymers, polydimethylsiloxane (PDMS), has wide range of applications in the area of advanced materials for biomedical and soft robotics. However, 3D printing with PDMS is challenging as it necessitates special compositions with UV-curable or thixotropic PDMS precursors.

In WO2016044547, Kenney et al. disclose a 3D printable ink consisting of silicone. The ink is printed by extruding a layer of photocurable liquid silicone rubber precursor and then using a certain wavelength of light to cure the ink. This method then prints another layer of the silicone rubber precursor on the printed- and cured layer of silicone rubber. However, Kenney et al. do not use a 3-phasic system. Kolesky et al. and Qin et al. introduce silicone rubber comprising artificial spider web and vascularized, heterogenous cell-laden tissue through 3D printing (Kolesky, D. B. et al. *Adv. Mater.* 2014, 26 (19), 3124-3130; Qin, Z.; et al. *Nat. Commun.* 2015, 6 (May), 8038). The silicone rubber ink used by these investigators is composed of non-flowing silicone precursor, which is commercially available from Dow Corning. However, the printed material results in a "homogeneous" filament like structure which does not provide a porous structure. Hinton et al., describe a method for silicone rubber printing in a hydrophilic support bath such as Carbopol gel (Hinton, T. J. et al. *ACS Biomater. Sci. Eng.* 2016, 2, 1781-1786). This ink composition does not have the capability to maintain stable 3D structure, and instead this system uses a gel-like medium which fixes the printed ink structure. Lipton et al. show a method of printing silicone rubber precursor by mixing it with wax particles (Lipton, J. I. et al. In 2014 *annual International Solid Freeform Fabrication Symposium*, Austin, Tex.; 2014; pp 848-856). The wax particles tune the viscoelastic response of the silicone rubber precursor. Finally, EP1415792 to Bredt et al. and U.S. Pat. No. 8,334,025 to Fong et al. disclose methods and compositions for three-dimensional printing. In their printing method, they deposit a layer of "dry" particles and apply binder on the top of them. The particles are heterogeneous and treated with a reactive group coating which provides a covalent bonding with the binder. However, the ink composition is not based on a particle in water suspension (multiphasic), the particle and the binder are not made of the same material, and the inks do not provide a flexible and elastic material after curing. What is needed are new compositions and methods for using silicone-based materials for three-dimensional printing.

The compositions and methods disclosed herein address these and other needs.

SUMMARY

The inventors have developed novel compositions and methods for three-dimensional printing of silicone rubber (also called polydimethylsiloxane or PDMS) via direct ink writing. The ink disclosed herein is composed of three primary parts: 1) cured silicone particles, 2) uncured silicone liquid precursor serving as a wetting (or bridging) liquid for silicone particles, and 3) a water phase that is used as a continuous medium for the ink formulation. The difference between cured silicone particle and uncured precursor is whether the molecular structure is crosslinked or not. By having the suspension particles and the wetting liquid composed of the identical chemical, the wetting and bridging of the cured silicone particles with uncured silicone liquid precursor is significantly improved compared to chemically heterogeneous systems. Once cured, the wetting silicone precursor forms covalent bonds to the silicone particles without any other surface treatment of the silicone particles. The water phase in the ink formulation mediates the interactions between silicone rubber particles and the wetting liquid and stabilizes it into printable thixotropic paste. The presence of the water phase in the ink composition yields porous structures, which can then be used biomedical applications. The porosity of the resulting structure allows the incorporation of bioactive factors into the structure. In addition, the ink compositions disclosed herein are capable of printing both in gaseous (air) and also in aqueous environments. This allows the 3D inks disclosed herein to be applied in vivo.

In one aspect, disclosed herein is a three-dimensional printable ink composition comprising:
polydimethylsiloxane (PDMS) microbeads suspended in a carrier liquid; and
a PDMS precursor liquid binding to the microbeads to form a paste-like material.

In some embodiments, the carrier liquid is water.

In some embodiments, the precursor liquid comprises:
liquid PDMS oligomers, or monomers; and
crosslinker, initiators, plasticizers, modifiers, fillers, or a combination thereof.

In some embodiments, the PDMS microbead suspension comprises a ratio from about 3 to 7 to about 7 to 3 by volume of the microbeads to volume of the carrier liquid. In some embodiments, the PDMS microbead suspension comprises from about 50% to about 80% by volume of the microbeads to volume of the carrier liquid.

In some embodiments, the PDMS precursor liquid forms capillary bridges between two or more PDMS microbeads at a time. In some embodiments, the PDMS precursor liquid completely encompasses the PDMS microbeads and forms capillary bridges between the PDMS microbeads. In some embodiments, the three-dimensional printable ink composition is a gel.

In another aspect, disclosed herein is a method of three-dimensional printing comprising: preparing a polydimethylsiloxane (PDMS) microbead suspension in a carrier liquid; adding a PDMS precursor liquid to the PDMS microbead suspension in the carrier liquid to form a three-dimensional printable ink composition;
extruding the three-dimensional printable ink composition into a desired three-dimensional structure; and
crosslinking the PDMS precursor liquid bridging the PDMS microbeads.

In some embodiments, the PDMS precursor liquid completely encompasses the PDMS microbeads and forms capillary bridges between the PDMS microbeads.

In some embodiments, the PDMS microbead suspension in the carrier liquid comprises: emulsifying the PDMS precursor liquid in a dispersion medium wherein the viscosity of the dispersion medium is approximately matched with the PDMS precursor liquid; and crosslinking the emulsified PDMS precursor liquid.

In some embodiments, the PDMS microbead suspension in the carrier liquid comprises:
mixing PDMS precursors and curing agents;
degassing the mixture of PDMS precursors and curing agents;
pre-emulsifying the mixture of PDMS precursors and curing agents in a dispersion medium wherein the viscosity of the dispersion medium is approximately matched with the mixture of PDMS precursors and curing agents;
emulsifying the PDMS pre-emulsion with a mechanical mixer to form a PDMS emulsion;
pouring the PDMS emulsion into water; and
stirring the PDMS emulsion in water at a temperature from about 65° C. to about 100° C. or using another treatment to polymerize the PDMS precursors into the PDMS microbead suspension.

In some embodiments, the dispersion medium comprises a water-soluble polymer selected from the group consisting of polyvinyl alcohol, polyvinyl pyrrolidone, xanthan gum, polyethylene glycols, polyacrylamide, and polyacrylic acid. In some embodiments, the dispersion medium comprises polyvinyl alcohol.

In some embodiments, the carrier liquid is water or a liquid forming a phase boundary with the liquid precursor.

In some embodiments, the PDMS microbead suspension comprises about 30% to about 70% by percent volume of the total composition. In some embodiments, the PDMS microbead suspension comprises about 50% percent by volume of the total composition.

In some embodiments, the three-dimensional printable ink composition transitions from a liquid state to a gel state once from about 1% to about 40% PDMS precursor liquid has been added by percent volume of the total composition. In some embodiments, the three-dimensional printable ink composition transitions from a liquid state to a gel state once about 2% or more of PDMS precursor liquid has been added by percent volume of the total composition. In some embodiments, the three-dimensional printable ink composition transitions from a liquid state to a gel state when the volume ratio of PDMS precursor liquid to PDMS microbeads is present in the range of about 2/98 v/v to about 40/60 v/v. In some embodiments, the desired three-dimensional structure is stabilized and bound together by cross-linking of the PDMS precursor liquid.

In some embodiments, the PDMS precursor liquid is polymerized to solid PDMS microbeads by thermal, chemical, ultraviolet, light, reactive gas, or pH change treatment.

In some embodiments, the three-dimensional printable ink composition is comprised of the microbead suspension and the precursor liquid, wherein the precursor liquid comprises polyurethane or an epoxy resin. In some embodiments, the method of three-dimensional printing is performed directly under water, a water medium on top of a biological tissue, or a water medium inside of a biological tissue.

BRIEF DESCRIPTION OF THE DRAWINGS

The accompanying figures, which are incorporated in and constitute a part of this specification, illustrate several aspects described below.

FIGS. 3A-3D show the change in rheological property of PDMS microbeads suspension with PDMS liquid precursor. a, Characterization of capillary bridged PDMS microbead suspension.

FIGS. 4A-4D show the morphologies and mechanical properties of crosslinked PDMS inks.

FIGS. 5A-5E show examples of 3D printed ultraflexible PDMS structures made after curing of capillary-bridged bead suspensions.

DETAILED DESCRIPTION

The inventors have developed novel compositions and methods for three-dimensional printing of silicone rubber (also called polydimethylsiloxane or PDMS) via direct ink writing. The ink disclosed herein is composed of three primary parts: 1) cured silicone particles, 2) uncured silicone liquid precursor serving as a wetting (or bridging) liquid for silicone particles, and 3) a water phase that is used as a continuous medium for the ink formulation. The difference between cured silicone particle and uncured precursor is whether the molecular structure is crosslinked or not. By having the suspension particles and the wetting liquid composed of the identical chemical, the wetting and bridging of the cured silicone particles with uncured silicone liquid precursor is significantly improved compared to chemically heterogeneous systems. Once cured, the wetting silicone precursor forms covalent bonds to the silicone particles without any other surface treatment of the silicone particles. The water phase in the ink formulation mediates the interactions between silicone rubber particles and the wetting liquid and stabilizes it into printable thixotropic paste. The presence of the water phase in the ink composition yields porous structures, which can then be used biomedical applications. The porosity of the resulting structure allows the incorporation of bioactive factors into the structure. In addition, the ink compositions disclosed herein are capable of printing both in gaseous (air) and in aqueous environments. This allows the 3D inks disclosed herein to be applied in vivo.

Reference will now be made in detail to the embodiments of the invention, examples of which are illustrated in the drawings and the examples. This invention may, however, be embodied in many different forms and should not be construed as limited to the embodiments set forth herein.

Unless defined otherwise, all technical and scientific terms used herein have the same meaning as commonly understood to one of ordinary skill in the art to which this invention belongs. The following definitions are provided for the full understanding of terms used in this specification.
Terminology The term "three-dimensional printing" (or "3D printing"), as used herein, generally refers to a process or method for generating a 3D part (or object). For example, 3D printing may refer to sequential addition of material layer or joining of material layers or parts of material layers to form a 3D structure, in a controlled manner (e.g., under automated control). Examples of 3D printing include additive printing (e.g., layer by layer printing, or additive manufacturing). The 3D printing may further comprise subtractive printing.

The term "carrier liquid" is to be understood both in the singular as the plural as mixtures of more than one carrier liquid are also intended to be covered by the term "carrier liquid".

The term "microbead" used herein may be a microbead having an average diameter ranging from 0.5 to 1000 and may be in the form of a generally spherical particle. In some embodiments, the microbeads have an average diameter ranging from 10 to 100 μm.

The term "paste-like" means that the system exhibits properties similar to the properties of a thixotropic material. In some embodiments, the water phase in the ink formulation mediates the interactions between silicone rubber particles and the wetting liquid and stabilizes it into printable thixotropic paste.

The term "thixotropic" means the material exhibits a decrease in viscosity with increasing shear. In other words, it exhibits high viscosity when subjected to low stress and lower viscosity when subjected to high stress (shaken, agitated, or otherwise stressed).

The term "crosslinker" or "cross-linking agent" refers to a substance that promotes or regulates intermolecular covalent bonding between polymer chains, linking them together to create a more rigid structure.

The term "filler" refers to a relatively inert material added to the composition to modify its strength, permanence, working properties, or other qualities, or to lower costs.

The term "initiator" refers to a substance or molecule, other than reactant, that initiates a chain reaction, such as in polymerization.

The term "polymer" is a generic term used to describe a substance made of molecules that have one or more types of repeating monomeric units connected by chemical bonds. A polymer has chains of varying lengths which occur because polymer chains terminate during polymerization after random intervals of chain lengthening (propagation).

Silicone Compositions and Methods of Three-Dimensional Printing

Polydimethylsiloxane (PDMS) is one of the most widely used materials in biomedical devices, electronic and consumer products, construction and mechanical device engineering. The inventors have developed 3D printing methods that allow 3D printing of PDMS into three dimensional structures by designing a unique multiphase composition and controlling the capillary interactions inside the composition.

First, a scalable technique for large-scale production of PDMS microbeads based on suspension polymerization was developed. Second, the inventors developed a way to turn these beads into thixotropic extrudable gels with a controlled yield stress. In order to achieve this, the PDMS microbead suspension in water was mixed with a small amount of liquid PDMS precursor. The liquid precursor phase leads to formation of capillary bridges between the beads and binds them into reconfigurable soft material. Within a certain volume ratio, the PDMS microbeads suspended in water and mixed with PDMS liquid precursor behaved as a gel which showed high elastic modulus and shear thinning. These gels made of PDMS beads and liquid PDMS binder can be extruded through a syringe and retain their shapes after deposition due to the high gel yield stress. The extruded gel can be thermally cured to become a highly flexible, stretchable, porous PDMS material. Thus, disclosed herein are means for 3D printing of a porous silicone rubbery material, which is a highly desirable matrix for a broad range of additive manufacturing applications in biology, medicine, microfluidics, electronics, consumer products and many others. The compositions and methods herein can also be applied for 3D printing with a large variety of other elastomers and polymers.

The present disclosure enables the fabrication of an efficient and scalable material used in the shaping of 3D structures from silicone rubber. The thixotropic (highly desirable in this case) characteristics of the 3D inks that have been designed can be adjusted precisely within a broad range of parameters by varying the ratio of the multiphase components. These inks can be used for 3D printing under water or inside biological medium. The unique rheology of the material also finds application in a broad range of further construction materials, and formulations for consumer and industrial products. These methods can further be adapted for making capillary gels and improved inks from a large variety of thermo- and photo-set polymers.

The present disclosure allows a large-volume mass fabricated material for one of the most rapidly growing technologies: 3D printing and other additive manufacturing methods. These compositions and methods also find application in the 3D printing of biomedical scaffolds (a major area of use of the PDMS silicone matrix). The PDMS capillary ink has the remarkable ability to be 3D-printed directly in water or in biological media. Such printing can be performed directly in contact with live tissue if light- or body-temperature triggered initiators are used. This technology also finds application in numerous medical, industrial and consumer products.

In addition to additive manufacturing, the compositions herein can be used in various gels, sealants, glues and binders. A key part of the compositions and methods involves the techniques disclosed herein for fabrication of the major component silicone microspheres, which is efficient and scalable and forms the basis for making new particles for dyes, coatings, drug delivery, agricultural and biomedical formulations.

In one aspect, disclosed herein is a three-dimensional printable ink composition comprising:
polydimethylsiloxane (PDMS) microbeads suspended in a carrier liquid; and
a PDMS precursor liquid binding to the microbeads to form a paste-like material.

In one aspect, disclosed herein is a three-dimensional printable ink composition comprising: polydimethylsiloxane (PDMS) microbeads suspended in a carrier liquid; and a PDMS precursor liquid bound to the microbeads.

In some embodiments, the carrier liquid is water or a liquid forming a phase boundary with the liquid precursor. In some embodiments, the carrier liquid comprises water. In some embodiments, the carrier liquid comprises an alcohol, a glycol, a hydrocarbon, and/or other relatively inert and immiscible liquid.

In some embodiments, the precursor liquid comprises: liquid PDMS oligomers, or monomers; and crosslinker, initiators, plasticizers, modifiers, fillers, and/or a combination thereof. In some embodiments, the precursor liquid comprises: liquid PDMS monomers; and initiators, plasticizers, modifiers, or fillers.

In some embodiments, the PDMS microbead suspension comprises a ratio from about 3 to 7 to about 7 to 3 by volume of the microbeads to volume of the carrier liquid. In some embodiments, the PDMS microbead suspension comprises a ratio from about 5 to 5 to about 7 to 3 by volume of the microbeads to volume of the carrier liquid. In some embodiments, the PDMS microbead suspension comprises a ratio from about 1 to 9 to about 9 to 1 by volume of the microbeads to volume of the carrier liquid.

In some embodiments, the PDMS microbead suspension comprises from about 50% to about 80% by volume of the microbeads to volume of the carrier liquid. In some embodiments, the PDMS microbead suspension comprises from about 30% to about 90% by volume of the microbeads to volume of the carrier liquid. In some embodiments, the PDMS microbead suspension comprises about 5 to about 5 by volume of the microbeads to volume of the carrier liquid.

In some embodiments, the PDMS precursor liquid forms capillary bridges between two or more PDMS microbeads at a time. In some embodiments, the PDMS precursor liquid forms capillary bridges between two or more PDMS microbeads. In some embodiments, the PDMS precursor liquid completely encompasses the PDMS microbeads and forms capillary bridges between the PDMS microbeads. In some embodiments, the three-dimensional printable ink composition is a gel.

In one aspect, disclosed herein is a three-dimensional printable ink composition comprising: polydimethylsiloxane (PDMS) microbeads suspended in a carrier liquid; and a PDMS precursor liquid binding to the microbeads. In another aspect, disclosed herein is a three-dimensional printable ink composition comprising: polydimethylsiloxane (PDMS) microbeads suspended in a carrier liquid; and a PDMS precursor liquid bound to the microbeads to form a thixotropic extrudable gel.

In another aspect, disclosed herein is a method of three-dimensional printing comprising: preparing a polydimethylsiloxane (PDMS) microbead suspension in a carrier liquid; adding a PDMS precursor liquid to the PDMS microbead suspension in the carrier liquid to form a three-dimensional printable ink composition; extruding the three-dimensional printable ink composition into a desired three-dimensional structure; and crosslinking the PDMS precursor liquid bridging the PDMS microbeads. In a further aspect, disclosed herein is a method of three-dimensional printing comprising: preparing a polydimethylsiloxane (PDMS) microbead suspension in a carrier liquid; adding a PDMS precursor liquid to the PDMS microbead suspension in the carrier liquid to form a three-dimensional printable ink composition; extruding the three-dimensional printable ink composition into a desired three-dimensional structure; and polymerizing the PDMS precursor liquid bridging the PDMS microbeads.

In some embodiments, the PDMS precursor liquid completely encompasses the PDMS microbeads and forms capillary bridges between the PDMS microbeads.

In some embodiments, the PDMS microbead suspension in the carrier liquid comprises: emulsifying the PDMS precursor liquid in a dispersion medium wherein the viscosity of the dispersion medium is approximately matched with the PDMS precursor liquid; and crosslinking the emulsified PDMS precursor liquid.

In some embodiments, the PDMS microbead suspension in the carrier liquid comprises:
mixing PDMS precursors and curing agents;
degassing the mixture of PDMS precursors and curing agents;
pre-emulsifying the mixture of PDMS precursors and curing agents in a dispersion medium wherein the viscosity of the dispersion medium is approximately matched with the mixture of PDMS precursors and curing agents;
emulsifying the PDMS pre-emulsion with a mechanical mixer to form a PDMS emulsion; pouring the PDMS emulsion into water; and stirring the PDMS emulsion in water at a temperature from about 65° C. to about 100° C. or using another treatment to polymerize the PDMS precursors into the PDMS microbead suspension.

In some embodiments, the dispersion medium comprises a water-soluble polymer selected from the group consisting of polyvinyl alcohol, polyvinyl pyrrolidone, xanthan gum, polyethylene glycols, polyacrylamide, and polyacrylic acid. In some embodiments, the dispersion medium comprises polyvinyl alcohol.

In some embodiments, the carrier liquid is water or a liquid forming a phase boundary with the liquid precursor. In some embodiments, the carrier liquid is water.

In some embodiments, the PDMS microbead suspension comprises about 30% to about 70% by percent volume of the total composition. In some embodiments, the PDMS microbead suspension comprises about 50% percent by volume of the total composition.

In some embodiments, the three-dimensional printable ink composition transitions from a liquid state to a gel state once from about 1% to about 40% PDMS precursor liquid has been added by percent volume of the total composition. In some embodiments, the three-dimensional printable ink composition transitions from a liquid state to a gel state once from about 1% to about 20% PDMS precursor liquid has been added by percent volume of the total composition. In some embodiments, the three-dimensional printable ink composition transitions from a liquid state to a gel state once about 2% or more of PDMS precursor liquid has been added by percent volume of the total composition. In some embodiments, the three-dimensional printable ink composition transitions from a liquid state to a gel state once about 2% PDMS precursor liquid has been added by percent volume of the total composition.

In some embodiments, the three-dimensional printable ink composition transitions from a liquid state to a gel state when the volume ratio of PDMS precursor liquid to PDMS microbeads is present in the range of about 2/98 v/v to about 40/60 v/v. In some embodiments, the desired three-dimensional structure is stabilized and bound together by cross-linking of the PDMS precursor liquid.

In some embodiments, the PDMS precursor liquid is polymerized to solid PDMS microbeads by thermal, chemical, ultraviolet, light, reactive gas, or pH change treatment.

In some embodiments, the three-dimensional printable ink composition is comprised of microbeads and liquid precursor selected from the group consisting of polyurethane and epoxy resins. In some embodiments, the method of three-dimensional printing is performed directly under water, a water medium on top of a biological tissue, or a water medium inside of a biological tissue.

EXAMPLES

The following examples are set forth below to illustrate the compositions, methods, and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Example 1. Three-Dimensional Printing with Capillary Bridging Using Multiphase Silicone/Water Inks In this example, a new three-dimensional printing ink was developed comprising a thermosetting polymer and a polydimethylsiloxane (PDMS), which are difficult to be used for a conventional melt-extrusion type of three-dimensional printing. The method combines a gelation of PDMS microbeads through formation of capillary bridges and use of the microbeads as an ink for three-dimensional printing. These capillary suspensions possess high storage moduli and yield stresses that are needed for direct ink writing. They can be 3D printed and cured both in air and under water. The resulting PDMS structures are remarkably elastic, flexible, and extendable. As the ink is made of porous, biocompatible silicone that can be printed directly inside aqueous medium, these materials can be used in 3D printed biomedical products, or in applications such as direct printing of bioscaffolds on live tissue.

The three dimensional printing (3D printing) technology has evolved significantly over the last decade in its ability to fabricate structures with complex topographical features on the micro and macroscale.[1-8] The 3D manufacturing via direct ink writing can shape various types of materials from plastics to metals by nozzle extrusion processes.[1,2,7,9-16] The inks for direct writing with polymers mostly contain thermoplastics, which allows hot melt nozzle extrusion followed by rapid cooling and solidification into target shape. It is more difficult to do 3D printing with elastomeric polymers, as their precursors are normally liquid at ambient conditions. The post-ejection curing complicates and slows down the process.

One of the most widely used elastomeric polymers, polydimethylsiloxane (PDMS), has wide range of applications in the area of advanced materials for biomedical and soft robotics.[12,13,17-21] However, 3D printing with PDMS is challenging as it necessitates special compositions with UV-curable or thixotropic PDMS precursors.[3,18,20,21] Direct ink writing of non-flowable PDMS precursor has been used to fabricate synthetic spider web and micro chambers.[12,18,21] Wax microparticles have been incorporated in PDMS precursors to make gel-like materials forming stable structures after extrusion.[22] More recently, PDMS liquid precursors were 3D printed by injection into a hydrophilic, thixotropic Carbopol gel, which acts as a scaffold/support.[23]

Capillarity can be a powerful alternative tool to shape "soft" 3D structures. Sandcastles formed by mixing sand with right amount of water can be considered as most ancient method of making 3D architectures. The structural stability of sandcastles is attributed to the formation of capillary bridges between the wet sand granules.[24-31] Similar capillary bridges are found in concentrated multiphasic suspensions, containing a small amount of immiscible liquid with <90° contact angle on the solid particles.[32-34] The interparticle capillary bridges lead to formation of 3D particle networks by confining the adjacent particle movements. These suspensions can have paste-like consistency and significant elastic modulus and static yield stress.[33,34] Such pastes behave as elastic, shape-retaining solids at low stress, and as viscoelastic flowable liquids at high stress. 3D assemblies of glass microbeads linked via water capillary bridges by rapid water removal can retain their shape, albeit in fragile structures.[35] 3D printing with capillary bridged structures, however, requires multicomponent mixtures of solid suspension phase, surface-wetting liquid, and continuous medium. What is needed are capillary suspension inks that use the same elastomeric material both as solid beads and as liquid phase for capillary bridging, which can later be transformed into one single elastomer compound.

In this example, a new class of elastomeric 3D printing inks were developed. The inks comprise three components:

pre-cured PDMS microbeads, uncured PDMS liquid precursor, and water medium. The liquid precursor binds the microbeads by capillarity, yielding a thixotropic extrudable gel-like phase. The mechanical properties of these capillary suspension gels were characterized. This gel phase can be arrested after extrusion by crosslinking (curing) of the liquid PDMS binding the microbeads, yielding 3D silicone structures that are highly elastic and stretchable. The capability of this approach is demonstrated by several unique objects fabricated by 3D printing in air and under water.

Figure 1A:
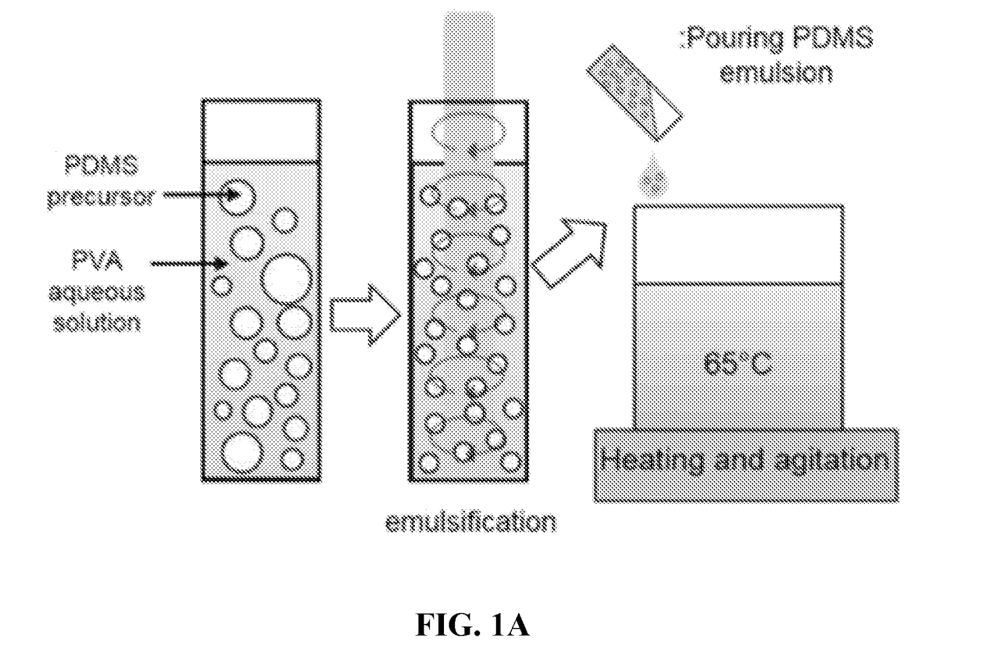
FIGS. 1A-1B show a (FIG. 1A) schematic on fabrication of PDMS microbeads, and an (FIG. 1B) optical microscope photograph of formed PDMS microbeads with varied shear rate.
Figure 1B:
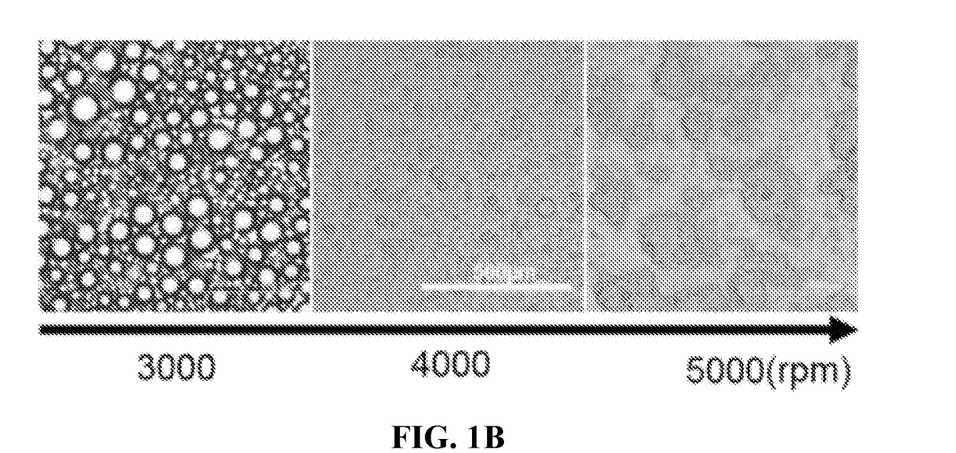

A scalable technique was developed herein for producing PDMS microbeads which are a major component of PDMS inks. The technique involves two steps: 1) emulsification and 2) crosslinking of PDMS precursor (shown in FIG. 1a). 14 wt. % PVA aqueous solution was used as a medium for preparation of micrometer-sized PDMS because low interfacial tension and high viscosity of sheared medium are needed to form micrometer-sized PDMS emulsion. 6 g of PDMS precursor was added into 30 ml of PVA aqueous solution and emulsified. The emulsion was then gently poured into 65° C. of deionized (DI) water (300 ml) and agitated using a magnetic stirrer bar. FIG. 1b shows examples of the prepared PDMS microbead suspensions formed by the described method. The size of the PDMS microbeads decreased when the shear rate was increased.

Figure 2:
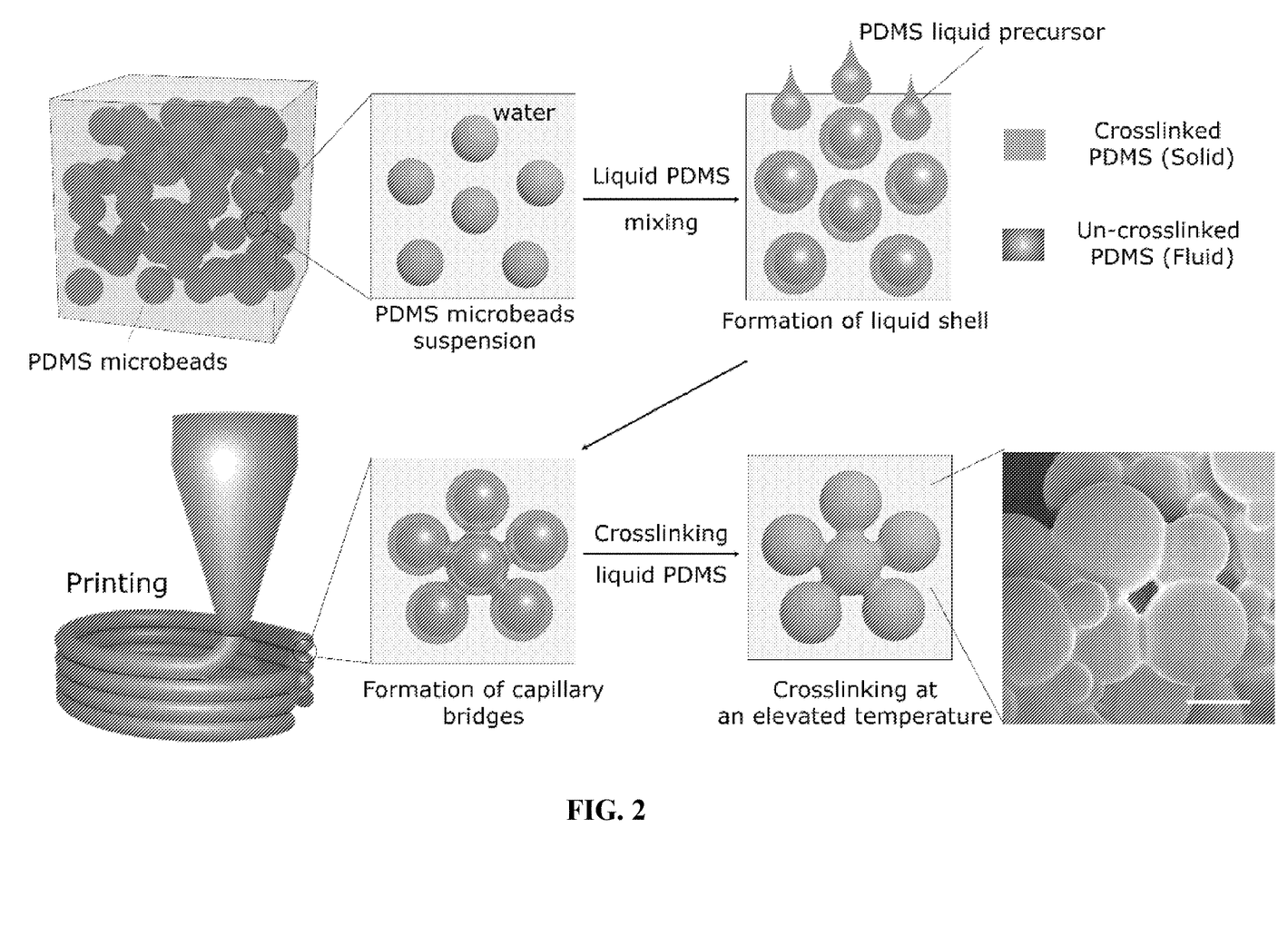
FIG. 2 shows a schematic for the principle of 3D printing process of PDMS particle suspension with capillary bridges. The PDMS microbead suspensions in water are mixed with liquid precursor. The suspensions turned into gels as LP formed capillary bridges among adjacent PDMS MBs. The gel-like suspensions are extruded into filaments via a nozzle. The 3D printed PDMS structures are heat-cured at 85° C. to crosslink the bridges and lock-in the structure from single silicone component (scale bar=20 µm).

The conceptual schematic of the overall procedure for making these PDMS inks is described in FIG. 2. First, a suspension of PDMS microbeads (MBs) is prepared as described above. Polysorbate 20 was used as a dispersion stabilizer during the PDMS bead synthesis. The suspension was then mixed with the PDMS liquid precursor (LP) using a mechanical mixer leading to surface wetting of the MBs with uncured LP. Direct surface contacts between the wetted MBs during the blending process leads to the formation of LP capillary bridges between the beads (FIG. 2). The formation of these bridges transformed the free-flowing PDMS suspension into viscoelastic paste. The paste is extrudable and can be printed into 3D structures. These structures were further heat-cured at 85° C. to selectively crosslink the liquid silicone bridges between the microbeads, resulting into robust, flexible and elastic 3D architectures.

Figure 3A:
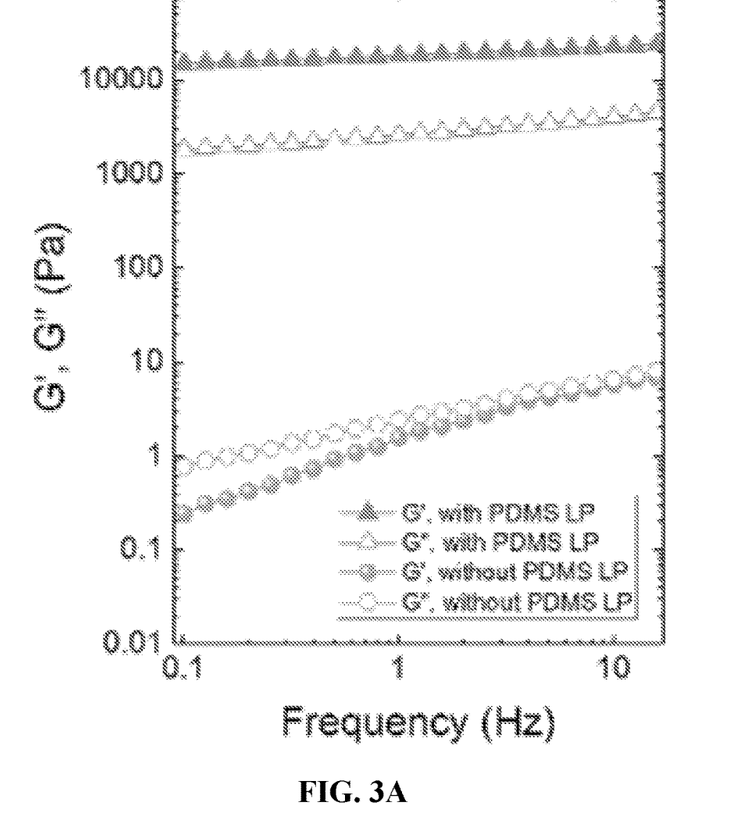
FIG. 3A) Change in the storage and loss modulus with the frequency of PDMS microbead in water suspensions (50% v/v) with/without 2 vol. % of additional liquid PDMS precursor.
Figure 3B:
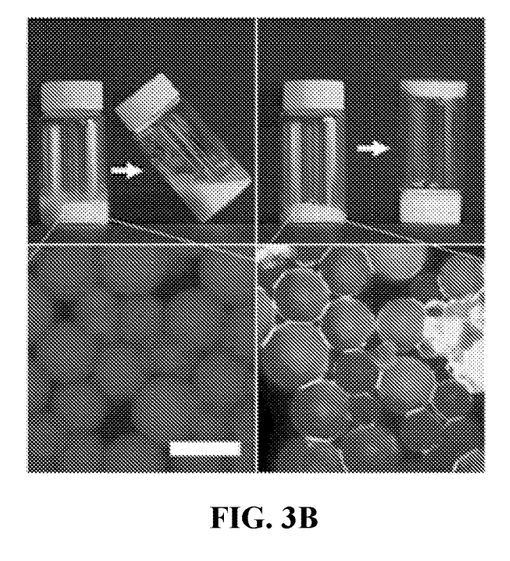
FIG. 3B) Fluorescence imaging of PDMS suspension without (left) and with (right) 2 vol. % of PDMS precursor. The PDMS MBs are tagged with Nile red, and LP phase contained Coumarin 6. The micrographs show the structure of microbead ink where the added liquid precursor forms capillary bridges between the beads (scale bar=20 µm).

To be applied to a 3D printer, the ink should have a strong mechanical stability not to have printed structures deformed during printing. The mechanical stability of PDMS inks was evaluated with the dynamic oscillatory measurement. Addition of a small amount of PDMS LP into prepared PDMS MB suspensions resulted in dramatic change in the rheological property of the suspension. The dynamic elastic modulus (G') versus frequency (ω) of PDMS microbead suspensions (5/5=v/v) with/without 2 vol. % of PDMS liquid precursor are shown in FIG. 3a. The suspension mixed with 2 vol. % of PDMS liquid precursor had around three orders of magnitude higher storage modulus and forms the stronger gel. Meanwhile, after mixing, capillary bridges are formed between the microbeads because of favorable wetting of the PDMS precursor on PDMS microbeads. The bridges can be visualized using fluorescence microscopy (FIG. 3b), where the PDMS microbeads are tagged with Nile red, and capillary bridges contain Coumarin 6. It is well known that the particle-particle interaction force induced by capillary bridges are far stronger than its van der Waal force. Incorporated with capillary force, the dramatic change in G' making stronger gel is fabricated[34]. Thus, the formation of capillary bridges triggered the suspension to become a stronger gel.

Figure 3C:
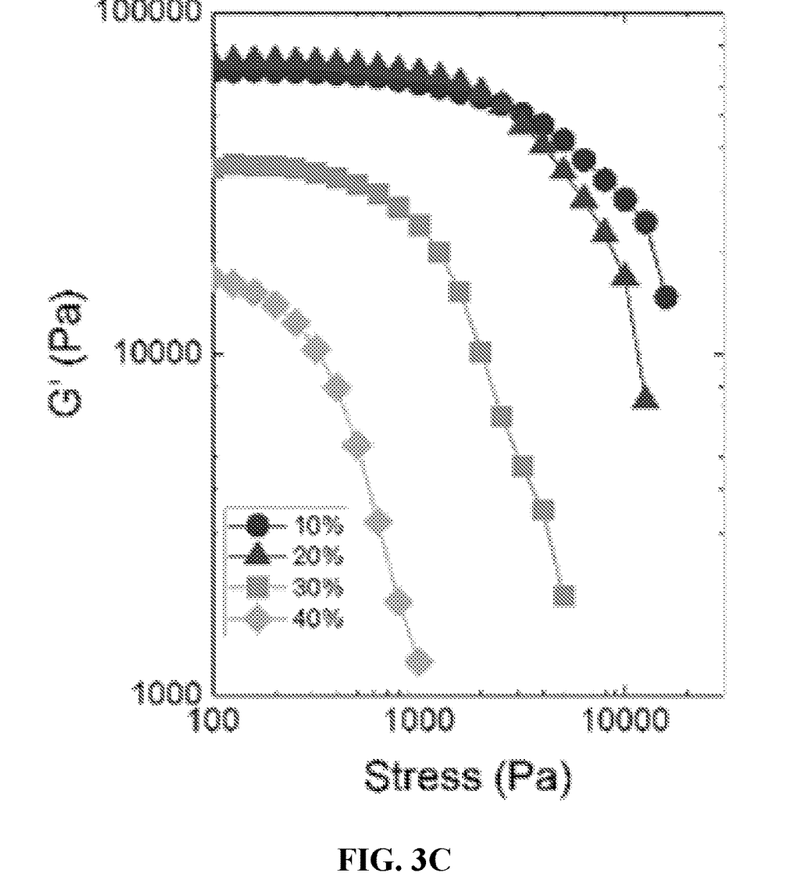
FIG. 3C) The elastic modulus of PDMS suspension mixed with various amounts of PDMS precursor plotted against the oscillation stress.
Figure 3D:
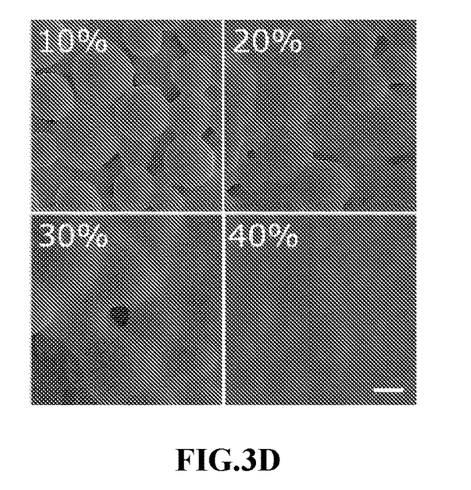
FIG. 3D) Field emission scanning electron micrograph (FE-SEM) of suspensions with increasing amount of liquid precursor (scale bar=20 µm). As the amount of surface wetting PDMS precursor increases (>20 vol. %), the microbeads are engulfed in the matrix of liquid PDMS.

The rheological property of PDMS suspension gel was further characterized for suspensions with stepwise addition of PDMS precursor (0-40 vol. % with respect to vol. of PDMS microbeads). The G' versus the oscillatory shear stress of the suspensions were measured as is described in FIG. 3c. All compositions of microbeads suspension showed gel-like behavior at low shear stress and yielding at high shear stresses. The microbead suspensions containing up to 20% of PDMS precursor showed both high yield stress and storage modulus (G'). However, yield stresses and storage moduli decrease as the amount of PDMS precursor increased >20 vol. % resulting weaker gels. This can be attributed to the morphological change of the PDMS suspension as illustrated in FIG. 3d. Up to 20 vol. % of PDMS precursor, curved capillary bridges of PDMS liquid were well presented. Meanwhile, as PDMS precursor concentration increase, almost all pores between particles were filled and capillary bridges were diminished as shown in FIG. 3d. Nevertheless, 30 vol. % of PDMS precursor in PDMS suspension still has high yield stress behaving like a gel. This can be attributed to the curvatures made by the PDMS microbeads and precursor on the surface induced negative capillary pressure[36-39] When added PDMS precursor exceeded 40%, the suspension behaved like a weak gel with a low yield stress and low elastic modulus. In summary, capillary pressures operate in the PDMS suspension gel system at 2 vol. % ~30 vol. % resulting in mechanically stable gels which are suitable for 3D printing inks.

Figure 4A:
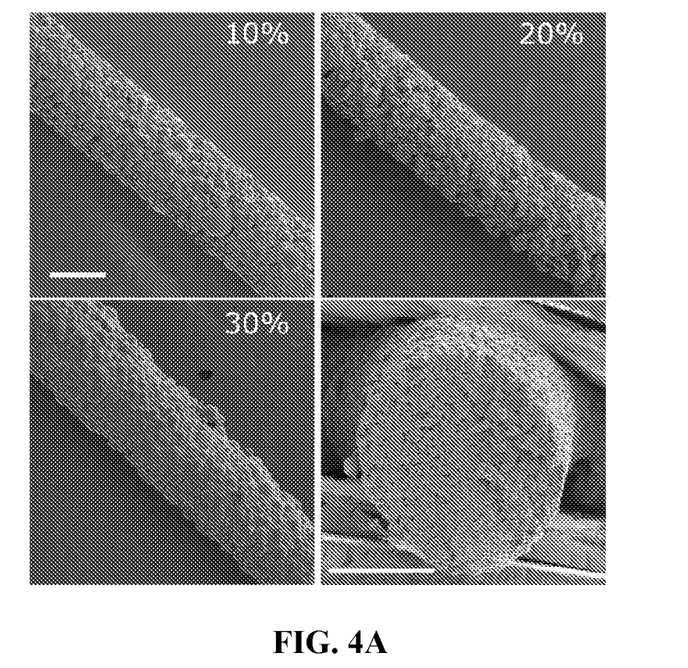
FIG. 4A) FE-SEM images of PDMS inks with different LP volume fractions ejected through nozzle of inner diameter 410 µm (scale bar=500 µm).
Figure 4B:
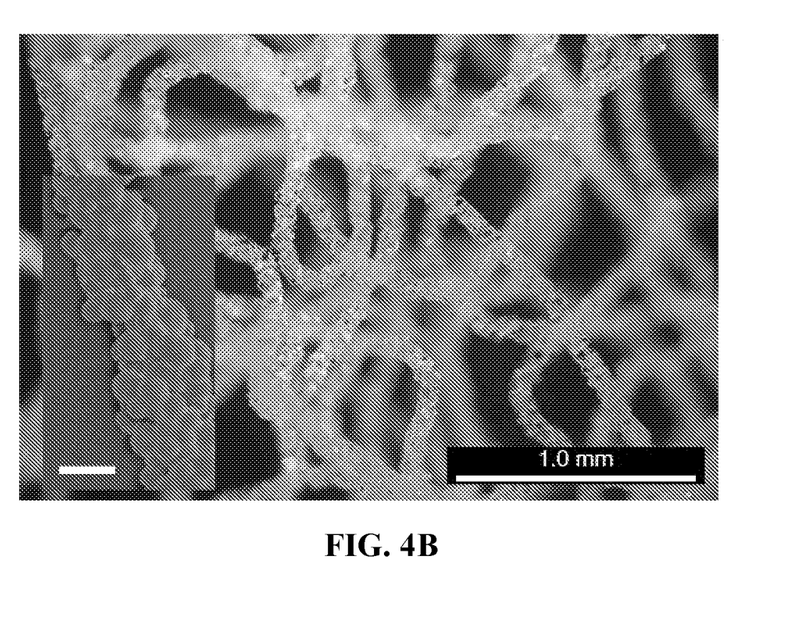
FIG. 4B) Optical and SEM images of PDMS fiber consisting of capillary suspension (Inset scale bar=50 µm). The wires preserve their shape even after ejection and crosslinking at 85° C.
Figure 4C:
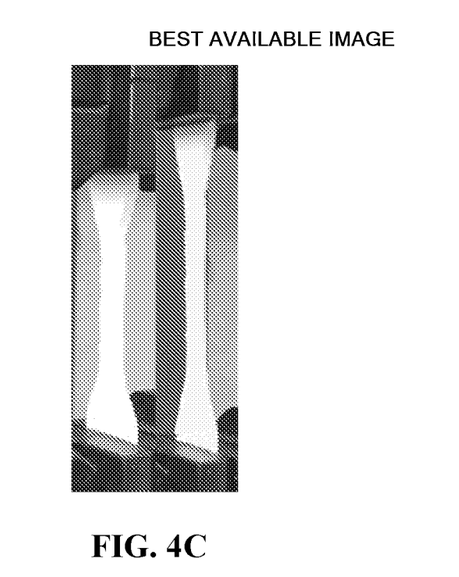
FIG. 4C) A photograph of extension of a PDMS slab with 10% of liquid precursor.
Figure 4D:
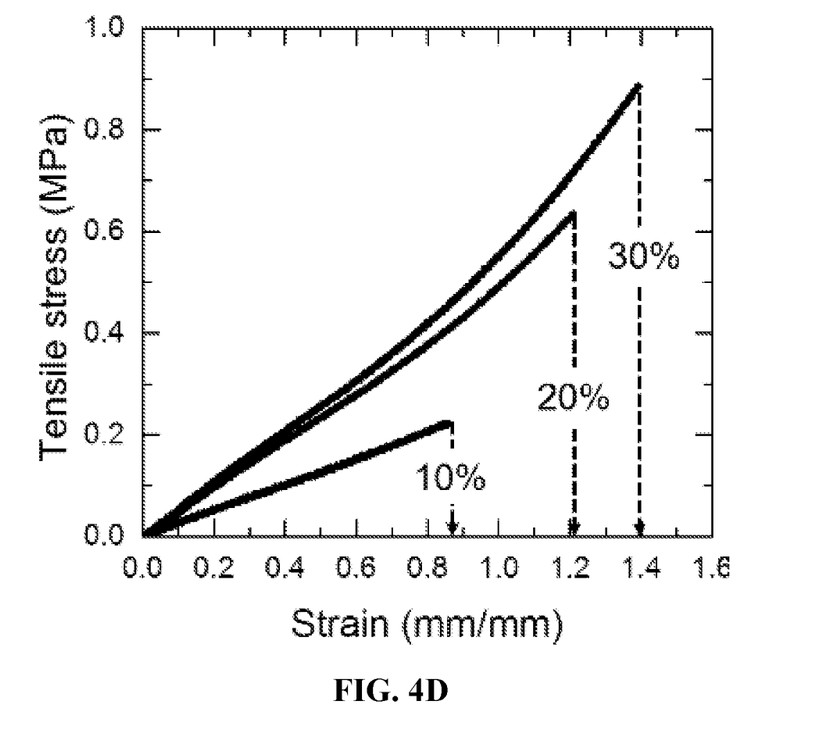
FIG. 4D) Extensional tensile stress vs. strain at increasing amount of initial LP precursor. The slope (Young's modulus) and maximum strain at break increase with larger amounts of the added precursor.

The PDMS suspension gels with 10%~30% PDMS additional precursor were then utilized as inks and they were ejected through a syringe nozzle (D≈500 μm) as shown in FIG. 4a. Ejected through the nozzle, a continuous and rod-like structures are formed. When a stress above its yielding point, the capillary induced gel exhibits a fluid-like behavior as is known as $$\tau = \tau_y + K\dot{\gamma}$$

where $\tau_y$ is the yield stress, K is the viscosity parameter and $\dot{\epsilon}$ is the shear rate.[32] When the $\tau$ is below $\tau_y$, G' is independent on how much the applied shear stress is. However, above $\tau_y$, the PDMS particles bound via capillary interactions can be ruptured and it results in sharp decrease in G' as shown in FIG. 3c. A freely deposited semi-flexible linear structure was extruded with a glass nozzle (D≈100 μm) is shown in FIG. 4b. Interestingly, the wire is composed of a small amount of PDMS microbeads along the radial direction. Therefore, scaling down of the printing dimensions can be performed using the methods described herein.

Once the PDMS suspension gels were thermally cured, it became more elastic. The PDMS microbead suspensions were crosslinked which had been mixed with various amounts of additional liquid precursor at an elevated temperature (85° C.) for 2 hrs. Through the thermal curing, the PDMS liquid precursors filling the spaces between the PDMS granules were solidified (FIG. 4a). Furthermore, the introduction of the chemical crosslinking of PDMS bridges made the PDMS microbeads bound each other permanently. The fixation of PDMS microbeads through the thermal curing removed the thixotropic response of the suspension but newly induce more elasticity like rubbery polymers. The tensile testing was performed with the cured PDMS suspensions after molding them into dog bone shapes as described in ASTM D412. FIG. 4b illustrates the tensile stress versus strain curves of the specimen. It is worth noting that the PDMS specimen mixed less than 10% of PDMS binders was fragile. Meanwhile, the PDMS specimen with more than 10% of PDMS binders had elasticities even with a stain above 50%. As higher amounts of PDMS liquid precursors were added, the tensile modulus and maximum elongation at break also increased. The increase in the tensile modulus of cured PDMS suspension with the amount of PDMS binders reversely correlated with the rheological properties of uncured PDMS suspensions in FIG. 3c. While the mechanical strength of the 'uncured' PDMS suspension increased with the capillary bridging forces, it also makes more porous structures which commonly harm the tensile modulus of a materials.[40] Therefore, the mechanical properties of uncured and cured suspensions exhibit opposite trend, respectively.

Figure 5A:
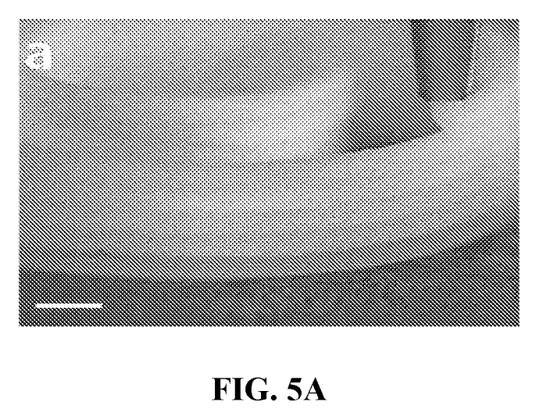
FIG. 5A) Printing of multi-layered spiral structure (scale bar=1.0 mm).
Figure 5B:
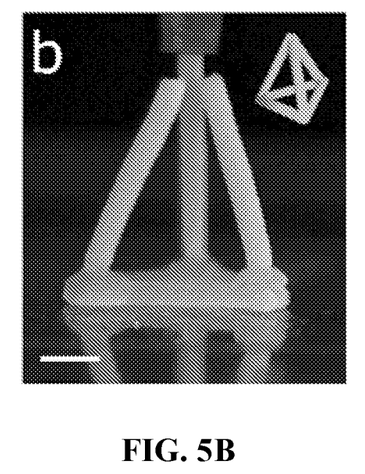
FIG. 5B) A snapshot of the process of printing of tetrahedral frame (scale bar=1.0 mm). The ejected uncured structure is self-standing.

The PDMS inks were deposited with controlled air pressure on an automatically moving x-y-z stage resulting various three-dimensional structures. A multi-layered spiral structure comprising PDMS inks with 25% of PDMS precursor are shown in FIG. 5a. With multi-layered structure, it retained its printed shape due to high mechanical stability. FIG. 5b describes their capability of self-standing. The analytical solution for maximum height ($h_{crit}$) of stable self-standing structures is correlated as [26]

$$h_{crit} = \left( \frac{9 J_{(-1/3)}^2}{16} \frac{G' R^2}{\rho g} \right)^{1/3}$$

where G' is the elastic modulus, R the radius of the rod, ρ is density, g the gravitational acceleration, and J is the smallest positive root of the Bessel function of the first kind of order −⅓. With the high elastic modulus, the printed tetrahedral structure did not exhibit deformations.

Figure 5C:
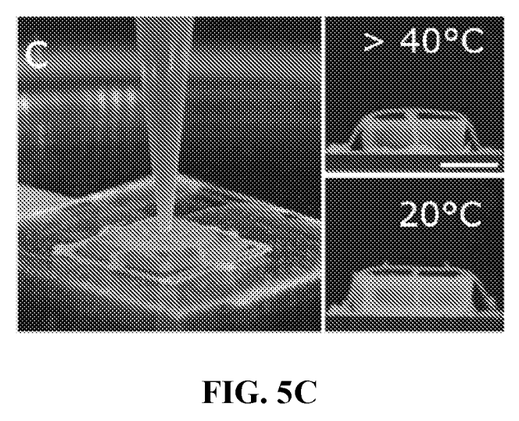
FIG. 5C) PDMS ink printing under PBS solution around a NIPAAm hydrogel body (left). After crosslinking in water, the filaments of the printed "cage" can be highly stretched by temperature-triggered expansion of NIPAAm hydrogel body (right, top and bottom, scale bar=5.0 mm).

Owing to the biocompatibility and elasticity of silicone, its 3D printed objects can be essential for numerous biomedical applications.[12,21] The PDMS capillary ink has the remarkable ability to be 3D-printed directly in water, in biological media, and potentially even into live tissue. This environment was simulated by printing inside phosphate-buffered saline (PBS) solution and crosslinking the structures. FIG. 5c show a "cage" of PDMS ink (MB/LP=7/3) printed in-situ around a N-isopropylacrylamide (NIPAAm) hydrogel block (green color) immersed in PBS solution. NIPAAm gel was chosen as the block substrate because it rapidly changes volume at its lower critical solution temperature (~34° C.),[41,42] which further allows to test the elasticity of the printed cage. The NIPAAm hydrogel block was made by procedures reported previously.[42] Crossed cage filaments were printed on the top of the NIPPAm hydrogel block, which were connected to a filaments frame printed on the underlying PDMS film (FIG. 5c). After crosslinking the printed filaments cage, the temperature was gradually decreased below the NIPAAm critical point. As the hydrogel block gradually expanded, the cage filaments stretched without breaking. This result points out that the capillarity based PDMS inks are printable and curable in-situ under water, without loss of elasticity. Such printing can potentially be performed directly in contact with live tissue if light- or body-temperature triggered initiators are used.

Figure 5D:
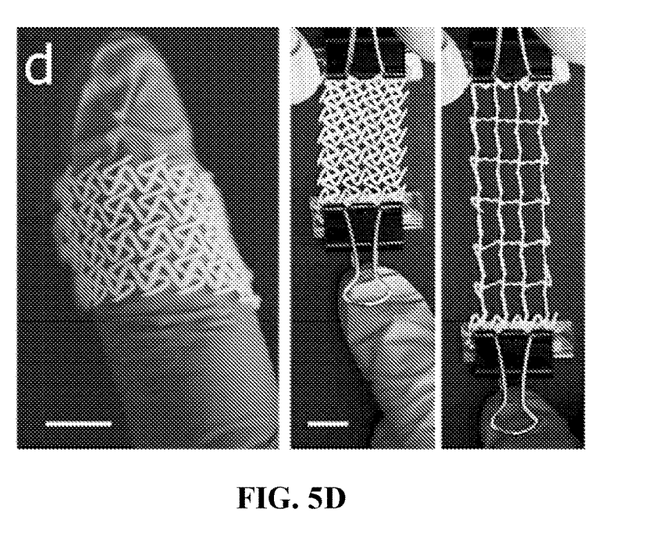
FIG. 5D) Elastin-like structure with high size extensivity and flexibility (scale bars=10 mm and 5 mm, respectively).
Figure 5E:
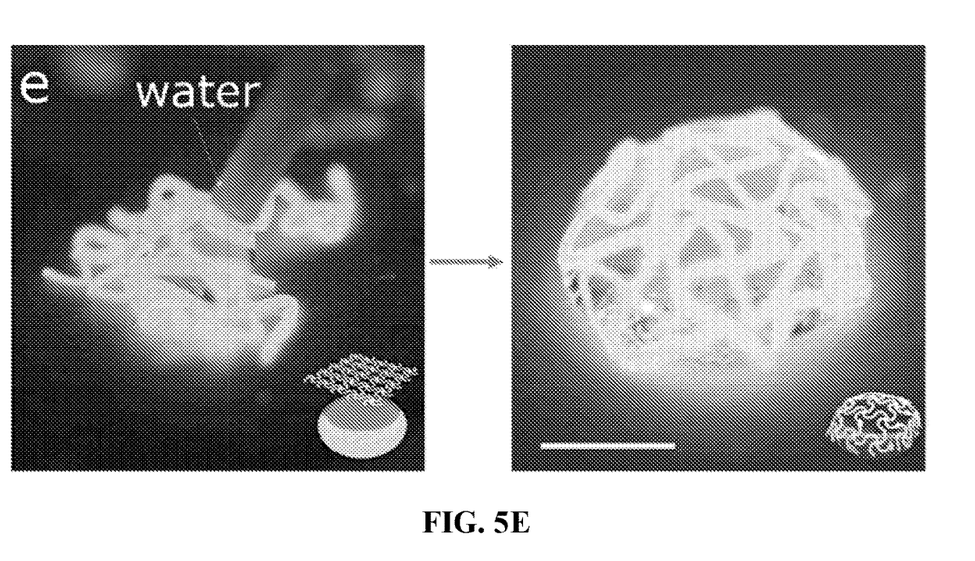
FIG. 5E) Wrapping and encapsulation of a single water droplet by an ultrasoft hydrophobic mesh (scale bar=5.0 mm).

Another example of the unique property of printed PDMS is shown here. The elasticity of a material can be tuned through modifying the structure[43]. Incorporated with the elasticity of PDMS, printing it into elastin-like structure gives them ultra-flexibility. FIG. 5d shows an example of a macroscopic elastin like structure printed and cured with the PDMS inks. The PDMS elastin-like structure exhibits being adopted to various types of surfaces by changing its shape due to its ultra-flexibility. Indeed, it is noteworthy that PDMS has wettability with water. When the PDMS elastin-like structure are exposed to water droplet, it can wrap the droplet by changing its structure as is also called 'Capillary origami'[44,45] in FIG. 5e. This was performed on a super-hydrophobic surface. The phenomena happen only when the surface capillary force induced on water droplet dominate over the bulk force such as tensile strength of PDMS. While the surface forces exceed the bulk force usually at microscale system, it was made in millimeter scale. The result proves the ultra-flexibility of the printed PDMS elastin-like structure.

In summary, a 3D printable multi-phase ink is disclosed herein comprising water and two silicone-based components. It contains crosslinked PDMS microbeads and liquid non-crosslinked PDMS phase. Owing to the capillary binding of the microbeads, suspensions containing certain fractions of PDMS liquid precursor behaved like pastes, which are flowable at high shear stress and possess high storage moduli and yield stresses that are needed for direct ink writing. These PDMS suspension pastes are directly extruded with air pressure and shaped on a 3D printer. Due to their mechanical stability, structures such as multi-layered spirals and free-standing filaments can be printed. The liquid PDMS bridges were thermally crosslinked after printing. The crosslinked PDMS material exhibited excellent elasticity and stretchability. Its porosity and mechanical properties, such as tensile modulus, can be controlled by the fraction of liquid precursor in the original paste. Moreover, self-standing, elastic, and cohesive structures can be made by printing and curing the ink under aqueous solutions. As this ink is made of porous, biocompatible silicone it can be used in 3D printed biomedical products, or in applications such as direct printing of bio-scaffolds in biological medium on top or inside live tissue. The high softness, elasticity and resilience of these 3D printed structures can also be used in soft robotics and stimuli-responsive materials.

Methods

Synthesis of PDMS microbeads: The synthesis of PDMS microbeads was performed in two steps: 1) emulsification of PDMS precursors (Sylgard 184, Dow corning) and 2) cross-linking of the emulsified PDMS precursor droplets. 10:1 mixtures of PDMS precursors and curing agents were mixed and degassed in a desiccator under vacuum. Aliquots of 6 ml of PDMS precursors were pre-emulsified in a 50 ml centrifuge tube containing 30 ml of 14 wt. % polyvinyl alcohol (Mowiol 18-88, Sigma-Aldrich) aqueous solution on a vortex mixer (Vortex Genie 2, Scientific Industry, USA). The pre-emulsified PDMS emulsions were then further emulsified with a Servodyne electronic mixer (Cole-Parmer, Model #50003, USA) at 3,000 rpm. After emulsification, the PDMS emulsions were poured and stirred in DI water at 85° C. for 2 hrs. The crosslinked PDMS microbeads were then rinsed 10 times with 50 ml of aqueous solution of polysorbate 20 (0.1 wt. %, Sigma-Aldrich) for further use.

Preparation of PDMS inks: As-prepared MBs in water suspension was thoroughly blended with liquid PDMS precursor (10/1 precursor/curing agent mixture). The post-mixing step was facilitated by a vortex mixer and the suspension was further mixed with the Servodyne electronic mixer at 6,000 rpm for 10 mins. Resulting mixtures exhibited gel-like behaviors and were thoroughly blended using a mortar and pestle.

Characterization of PDMS inks: For the rheological analysis of PDMS capillary suspensions, a plate-plate geometry (Diameter: 25 mm) was used for both dynamic shear measurements with 1.0 mm gap size (AR 2000, TA instrument). Sand paper circles were attached to the plates to prevent wall slip. For the PDMS MB suspension without LP, a cone and plate geometry (Diameter: 60 mm, 2°) was used. Every measurement was performed after oscillatory pre-shearing at 1 rad/s for 10 mins with a strain of 0.5 and equilibrium for 10 mins and 1.0 Hz for reproducible data. The small amplitude oscillatory measurement was conducted within the linear viscoelastic regime of the materials. The linear viscoelastic regime was determined via strain sweep test at fixed frequencies (1 rad/s and 100 rad/s). The tensile testing of the cured PDMS capillary suspensions was conducted after molding the suspensions into a dog bone shape (ASTM D412). The crosshead speed of the testing was 5.0 mm/min (5943 Instron). Fluorescent microscopy (BX-61 microscope, Olympus) and Field emission scanning electron microscopy (Verios 460L FE-SEM, FEI) were used to visualize and analyze the morphology of PDMS capillary suspensions and the deposited PDMS inks. Here the PDMS MBs were tagged in red color with Nile red dye (Sigma-Aldrich), and the capillary bridges were colored in yellow by addition of Coumarin 6 dye (Acros organics). After each marker component was mapped by fluorescence microscope, two color channels were merged through ImageJ software.

REFERENCES

[1] G. M. Gratson, M. Xu, J. A. Lewis, *Nature* 2004, 428, 386.
[2] J. A. Lewis, *Adv. Funct. Mater.* 2006, 16, 2193.
[3] J. R. Tumbleston, D. Shirvanyants, N. Ermoshkin, R. Janusziewicz, A. R. Johnson, D. Kelly, K. Chen, R. Pinschmidt, J. P. Rolland, A. Ermoshkin, E. T. Samulski, J. M. Desimone, *Science* 2015, 347, 1349.
[4] S. Hong, D. Sycks, H. F. Chan, S. Lin, G. P. Lopez, F. Guilak, K. W. Leong, X. Zhao, *Adv. Mater.* 2015, 4035.
[5] C. B. Highley, C. B. Rodell, J. A. Burdick, *Adv. Mater.* 2015, 27, 5075.
[6] D. P. Parekh, C. Ladd, L. Panich, K. Moussa, M. D. Dickey, *Lab Chip* 2016, 16, 1812.
[7] C. Ladd, J.-H. So, J. Muth, M. D. Dickey, *Adv. Mater.* 2013, 25, 5081.
[8] J. J. Martin, B. E. Fiore, R. M. Erb, *Nat. Commun.* 2015, 6, 8641.
[9] J. A. Lewis, G. M. Gratson, *Mater. Today* 2004, 7, 32.
[10] S. L. Morissette, J. A. Lewis, P. G. Clem, J. Cerano, D. B. Dimos, *J. Am. Ceram. Soc.* 2001, 84, 2462.
[11] Q. Li, J. A. Lewis, *Adv. Mater.* 2003, 15, 1639.
[12] D. B. Kolesky, R. L. Truby, A. S. Gladman, T. A. Busbee, K. A. Homan, J. A. Lewis, *Adv. Mater.* 2014, 26, 3124.
[13] M. Wehner, R. L. Truby, D. J. Fitzgerald, B. Mosadegh, G. M. Whitesides, J. A. Lewis, R. J. Wood, *Nature* 2016, 536, 451.
[14] A. S. Gladman, E. A. Matsumoto, R. G. Nuzzo, L. Mahadevan, J. A. Lewis, *Nat. Mater.* 2016, 1.
[15] M. A. Skylar-Scott, S. Gunasekaran, J. A. Lewis, *Proc. Natl. Acad. Sci.* 2016, 113, 6137.
[16] M. R. Sommer, L. Alison, C. Minas, E. Tervoort, P. A. Rühs, A. R. Studart, *Soft Matter* 2017, 13, 1974.
[17] D. Kokkinis, M. Schaffner, A. R. Studart, *Nat. Commun.* 2015, 6, 8643.
[18] Z. Qin, B. G. Compton, J. A. Lewis, M. J. Buehler, *Nat. Commun.* 2015, 6, 8038.
[19] S. Shan, S. H. Kang, J. R. Raney, P. Wang, L. Fang, F. Candido, J. A. Lewis, K. Bertoldi, *Adv. Mater.* 2015, 27, 4296.
[20] A. Clausen, F. Wang, J. S. Jensen, O. Sigmund, J. A. Lewis, *Adv. Mater.* 2015, 27, 5523.
[21] D. B. Kolesky, K. A. Homan, M. A. Skylar-Scott, J. A. Lewis, *Proc. Natl. Acad. Sci. U.S. A.* 2016, 113, 3179.
[22] J. I. Lipton, S. Angle, H. Lipson, 2014 *Annu. Int. Solid Free. Fabr. Symp.* Austin, Tex. 2014, 848.
[23] T. J. Hinton, A. Hudson, K. Pusch, A. Lee, A. W. Feinberg, *ACS Biomater. Sci. Eng.* 2016, 2,1781.
[24] M. Scheel, R. Seemann, M. Brinkmann, M. Di Michiel, A. Sheppard, B. Breidenbach, S. Herminghaus, *Nat. Mater.* 2008, 7, 189.
[25] A. Kudrolli, *Nat. Mater.* 2008, 7, 174.
[26] M. Pakpour, M. Habibi, P. Moller, D. Bonn, *Sci. Rep.* 2012, 2, 549.
[27] B. Bharti, A.-L. Fameau, M. Rubinstein, O. D. Velev, *Nat. Mater.* 2015, 14, 1104.
[28] P. A. Kralchevsky, K. Nagayama, *Adv. Colloid Interface Sci.* 2000, 85, 145.
[29] B. Bharti, A.-L. Fameau, O. D. Velev, *Faraday Discuss.* 2015, 181, 437.
[30] B. Bharti, D. Rutkowski, K. Han, A. U. Kumar, C. K. Hall, O. D. Velev, *J. Am. Chem. Soc.* 2016, 14948.
[31] O. D. Velev, N. D. Denkov, V. N. Paunov, P. A. Kralchevsky, K. Nagayama, *Langmuir* 1993, 9, 3702.
[32] S. Van Kao, L. E. Nielsen, C. T. Hill, *J. Colloid Interface Sci.* 1975, 53, 367.
[33] H.-J. Butt, *Science* 2011, 868.
[34] E. Koos, N. Willenbacher, *Science* 2011, 331, 897.
[35] J. Chopin, A. Kudrolli, *Soft Matter* 2015, 11, 659.
[36] J. N. Israelachvili, *Intermolecular and Surface Forces*, Academic Press, New York, 1992.
[37] S. M. Iveson, J. D. Litster, K. Hapgood, B. J. Ennis, *Powder Technol.* 2001, 117, 3.
[38] S. M. Iveson, J. D. Litster, *Powder Technol.* 1998, 99, 243.
[39] S. M. Iveson, J. D. Litster, *Powder Technol.* 1998, 99, 234.
[40] J. C. Wang, *J. Mater. Sci.* 1984, 19, 801.
[41] D. Morales, B. Bharti, M. D. Dickey, O. D. Velev, *Small* 2016, 12, 2283.
[42] D. Morales, I. Podolsky, R. W. Mailen, T. Shay, M. D. Dickey, O. D. Velev, *Micromachines* 2016, 7, 98.
[43] K.-I. Jang, H. U. Chung, S. Xu, C. H. Lee, H. Luan, J. Jeong, H. Cheng, G.-T. Kim, S. Y. Han, J. W. Lee, J. Kim, M. Cho, F. Miao, Y. Yang, H. N. Jung, M. Flavin, H. Liu, G. W. Kong, K. J. Yu, S. Il Rhee, J. Chung, B. Kim, J. W. Kwak, M. H. Yun, J. Y. Kim, Y. M. Song, U. Paik, Y. Zhang, Y. Huang, J. A. Rogers, *Nat. Commun.* 2015, 6, 6566.
[44] C. Py, P. Reverdy, L. Doppler, J. Bico, B. Roman, C. N. Baroud, *Phys. Rev. Lett.* 2007, 98, 2.
[45] J. D. Paulsen, V. Demery, C. D. Santangelo, T. P. Russell, B. Davidovitch, N. Menon, *Nat. Mater.* 2015, 14, 1206.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

We claim:

1. A three-dimensional printable ink composition comprising:
   (a) polydimethylsiloxane (PDMS) microbeads suspended in a carrier liquid; and
   (b) a PDMS precursor liquid binding to the microbeads; wherein the PDMS precursor liquid comprises:
      (a) liquid PDMS oligomers, or monomers; and
      (b) crosslinker, initiators, plasticizers, modifiers, fillers, or a combination thereof.

2. The composition of claim 1, wherein the carrier liquid is water.

3. The composition of claim 1, wherein the PDMS microbead suspension comprises a ratio from about 3 to 7 to about 7 to 3 by volume of the microbeads to volume of the carrier liquid.

4. The composition of claim 3, wherein the PDMS microbead suspension comprises from about 50% to about 80% by volume of the microbeads to volume of the carrier liquid.

5. The composition of claim 1, wherein the PDMS precursor liquid forms capillary bridges between two or more PDMS microbeads at a time.

6. The composition of claim 1, wherein the PDMS precursor liquid completely encompasses the PDMS microbeads and forms capillary bridges between the PDMS microbeads.

7. The composition of claim 1, wherein the three-dimensional printable ink composition is a gel.

* * * * *